United States Patent
Bush et al.

(10) Patent No.: US 12,199,877 B2
(45) Date of Patent: *Jan. 14, 2025

(54) COMMUNICATION SYSTEM AND METHOD FOR INTEGRATING A DATA DISTRIBUTION SERVICE INTO A TIME SENSITIVE NETWORK

(71) Applicant: DOLBY INTELLECTUAL PROPERTY LICENSING, LLC, Wilmington, DE (US)

(72) Inventors: Stephen Francis Bush, Niskayuna, NY (US); Joel Frederick Markham, Niskayuna, NY (US); Andrew William Berner, Waterford, NY (US)

(73) Assignee: DOLBY INTELLECTUAL PROPERTY LICENSING, LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/157,243

(22) Filed: Jan. 20, 2023

(65) Prior Publication Data
US 2023/0336485 A1   Oct. 19, 2023

Related U.S. Application Data

(63) Continuation of application No. 17/069,702, filed on Oct. 13, 2020, now Pat. No. 11,563,688, which is a
(Continued)

(51) Int. Cl.
*H04L 47/22* (2022.01)
*H04L 41/0896* (2022.01)
(Continued)

(52) U.S. Cl.
CPC .......... *H04L 47/22* (2013.01); *H04L 41/0896* (2013.01); *H04L 47/24* (2013.01); *H04L 43/0894* (2013.01); *H04L 47/2416* (2013.01)

(58) Field of Classification Search
CPC ..... H04L 47/22; H04L 41/0896; H04L 47/24; H04L 43/0894; H04L 47/2416; Y04S 40/00
See application file for complete search history.

(56) References Cited

U.S. PATENT DOCUMENTS

| | | |
|---|---|---|
| 7,533,128 B1 | 5/2009 | Sanchez et al. |
| 7,933,228 B2 | 4/2011 | Coley |

(Continued)

FOREIGN PATENT DOCUMENTS

| | | |
|---|---|---|
| CN | 104734957 A | 6/2015 |
| KR | 20110046837 A | 5/2011 |
| WO | 2014160997 A1 | 10/2014 |

OTHER PUBLICATIONS

G Pardo-Castellote, "OMG data distribution service: architectural overview", Military Communications Conference, 2003. MILCOM '03.2003 IEEE, vol. 1, pp. 242-247, Oct. 13-16, 2003.
(Continued)

*Primary Examiner* — Donald L Mills
(74) *Attorney, Agent, or Firm* — Morgan, Lewis & Bockius LLP

(57) ABSTRACT

A system includes a scheduling device of a data distribution service (DDS) that determines bandwidth for communication of time sensitive communications between devices using the DDS in a time sensitive network (TSN). The scheduling device determines available bandwidth for communication of non-time sensitive communications of the control system using the DDS in the TSN, and controls communication of both the time sensitive and non-time sensitive communications in the TSN. The system also includes a traffic shaper of the TSN that receives a communication change from the control system at the TSN. The scheduling device changes one or more of the bandwidth for the communication of the time sensitive communications or
(Continued)

the available bandwidth for the communication of the non-time sensitive communications in the TSN without restarting at least one network device of the TSN and while ensuring communications of both the time sensitive communications and the non-time sensitive communications.

20 Claims, 5 Drawing Sheets

Related U.S. Application Data continuation of application No. 16/388,075, filed on Apr. 18, 2019, now Pat. No. 10,826,834, which is a continuation of application No. 15/199,282, filed on Jun. 30, 2016, now Pat. No. 10,298,503.

(51) Int. Cl.
  *H04L 47/24* (2022.01)
  *H04L 43/0894* (2022.01)
  *H04L 47/2416* (2022.01)

(56) References Cited

U.S. PATENT DOCUMENTS

| | | | |
|---|---|---|---|
| 9,246,847 B2 | 1/2016 | Mishra et al. | |
| 10,298,503 B2* | 5/2019 | Bush | H04L 41/0896 |
| 10,826,834 B2* | 11/2020 | Bush | H04L 41/0896 |
| 11,563,688 B2* | 1/2023 | Bush | H04L 47/22 |
| 2015/0078404 A1 | 3/2015 | Diab et al. | |
| 2015/0188996 A1 | 7/2015 | Park et al. | |
| 2016/0020987 A1 | 1/2016 | Wetterwald et al. | |
| 2016/0254959 A1* | 9/2016 | Arndt | H04L 41/40 370/235 |
| 2017/0102690 A1 | 4/2017 | Sait et al. | |
| 2017/0019479 A1 | 8/2017 | Rangarajan et al. | |
| 2017/0331748 A1* | 11/2017 | Mangin | H04L 47/826 |
| 2018/0026891 A1* | 1/2018 | Vasseur | H04L 47/25 370/235 |
| 2020/0412813 A1 | 12/2020 | Mong et al. | |
| 2023/0161332 A1* | 5/2023 | Chauvet | H04L 12/4641 718/104 |

OTHER PUBLICATIONS

Kehrer et al., "A comparison of fault-tolerance concepts for IEEE 802.1 Time Sensitive Networks (TSN)", Emerging Technology and Factory Automation (ETFA), 2014 IEEE, pp. 1-8, Sep. 16-19, 2014, Barcelona.
Notice of Allowance issued in corresponding U.S. Appl. No. 15/199,282 dated Jan. 11, 2019.
Non-Final Office Action Issued in corresponding U.S. Appl. No. 15/199,282 dated Apr. 6, 2018.
Notice of Allowance Issued in corresponding U.S. Appl. No. 16/388,075 dated Jul. 15, 2020.
Final Office Action issued in corresponding U.S. Appl. No. 16/388,075 dated Apr. 16, 2020.
Non-Final Office Action issued in corresponding U.S. Appl. No. 16/388,075 dated Oct. 8, 2019.
Time-Sensitive Networking (TSN) Task Group, https://1.leee802.org/tsn/, 2015, pp. 1-8 (Year 2015).

* cited by examiner

COMMUNICATION SYSTEM AND METHOD FOR INTEGRATING A DATA DISTRIBUTION SERVICE INTO A TIME SENSITIVE NETWORK

CROSS-REFERENCE TO RELATED APPLICATION

This application is a continuation of U.S. patent application Ser. No. 17/069,702 filed 13 Oct. 2020, which is a continuation of U.S. patent application Ser. No. 16/388,075 filed 18 Apr. 2019, now U.S. Pat. No. 10,826,834, which is a continuation of U.S. patent application Ser. No. 15/199,282 filed 30 Jun. 2016, now U.S. Pat. No. 10,298,503. The entire disclosures of all of the foregoing patent applications and patents are incorporated herein by reference.

FIELD

Embodiments of the present disclosure generally relate to systems and methods for communicating data in networks.

BACKGROUND

Various types of control systems communicate data between different sensors, devices, user interfaces, etc., in order to enable control operations of other powered systems. For example, locomotives, automobiles, surgical suites, power plants, etc., include many systems that communicate with each other in order to control operations of the locomotives, automobiles, surgical suites, and power plants.

The operations of these powered systems may rely on on-time and accurate delivery of data frames among various devices. Failure to deliver some data at or within designated times may result in failure of the powered system, which can have disastrous consequences. For example, the failure to deliver sensor data to a control system of a locomotive or rail vehicle system can result in the locomotive or rail vehicle system not applying brakes early enough to avoid a collision. Other control systems may fail to implement protective measures to avoid damage or injury to the systems or other equipment if data is not supplied at or within the designated times. Without timely information, feedback control systems cannot maintain performance and stability.

Some control systems may use a Data Distribution Service (DDS) to communicate on a network between the various devices. But, the DDS is not integrated with the network, and the network may need to be manually configured in order to create the network connections for the devices communicating within the DDS. Some offline tools can automate the configuration changes to a network to allow for changes in communication between the devices, but this can require a system shutdown and restart, which can be unsafe and/or costly with some control systems.

BRIEF DESCRIPTION

In one embodiment, a system includes a scheduling device of a DDS configured to determine bandwidth for communication of time sensitive communications between devices of a control system using the DDS in a time sensitive network (TSN). The scheduling device also is configured to determine available bandwidth for communication of non-time sensitive communications of the control system using the DDS in the TSN. The scheduling device is configured to control communication of the non-time sensitive communications in the TSN without preventing communication of the time sensitive communications in the TSN based on the available bandwidth and to control communication of the time sensitive communications in the TSN while also allowing for the non-time sensitive communications to be communicated in the TSN. The system also includes a traffic shaper of the TSN configured to receive a communication change from the control system at the TSN. Responsive to receiving the communication change, the scheduling device is configured to change one or more of the bandwidth for the communication of the time sensitive communications or the available bandwidth for the communication of the non-time sensitive communications in the TSN without restarting at least one network device of the TSN and while ensuring communications of both the time sensitive communications and the non-time sensitive communications.

In one embodiment, a method includes determining bandwidth for communication of time sensitive communications between devices of a control system using a DDS in a TSN, and determining available bandwidth for communication of non-time sensitive communications of the control system using the DDS in the TSN. The method also includes communicating the non-time sensitive communications in the TSN without preventing communication of the time sensitive communications in the TSN based on the available bandwidth and communicating the time sensitive communications in the TSN while also allowing for the non-time sensitive communications to be communicated in the TSN. The method further includes receiving a communication change from the control system at the TSN, and, responsive to the received communication change, changing one or more of the bandwidth for the communication of the time sensitive communications or the available bandwidth for the communication of the non-time sensitive communications in the TSN without restarting at least one network device of the TSN and while ensuring communications of both the time sensitive communications and the non-time sensitive communications.

In one embodiment, a distributed communication device includes a controller configured to one or more of store or access routing instructions that direct where data packets are to be forwarded within a TSN for one or more writing devices and one or more reader devices of a DDS. The device also includes routing hardware configured to be remotely located from the controller. Responsive to receiving instructions from the controller to change where the data packets are forwarded within the TSN, the routing hardware is configured to change where the data packets are forwarded within the TSN without restarting either the controller or the routing hardware.

BRIEF DESCRIPTION OF THE DRAWINGS

The subject matter described herein will be better understood from reading the following description of non-limiting embodiments, with reference to the attached drawings, wherein below.

DETAILED DESCRIPTION

Certain embodiments of the present disclosure provide systems and methods that integrate a DDS with Time-Sensitive Networking (TSN) such that changes to the DDS configuration are reflected within the TSN in real-time. DDS components, such as writer devices and reader devices (e.g., Writers and Readers) are able to directly communicate directly with TSN virtual link registration devices (e.g., Talkers and Listeners) to enable TSN stream reservation that dynamically changes to reflect the Quality-of-Service (QoS) requirements of DDS.

In one embodiment, the systems and methods described herein implement the DDS with software-defined networking (SDN) devices using TSN. The SDN devices separate the network control plane from the data plane in the network communication devices. This can allow for the network communication devices to be more efficient, compact, and programmable.

Figure 1:
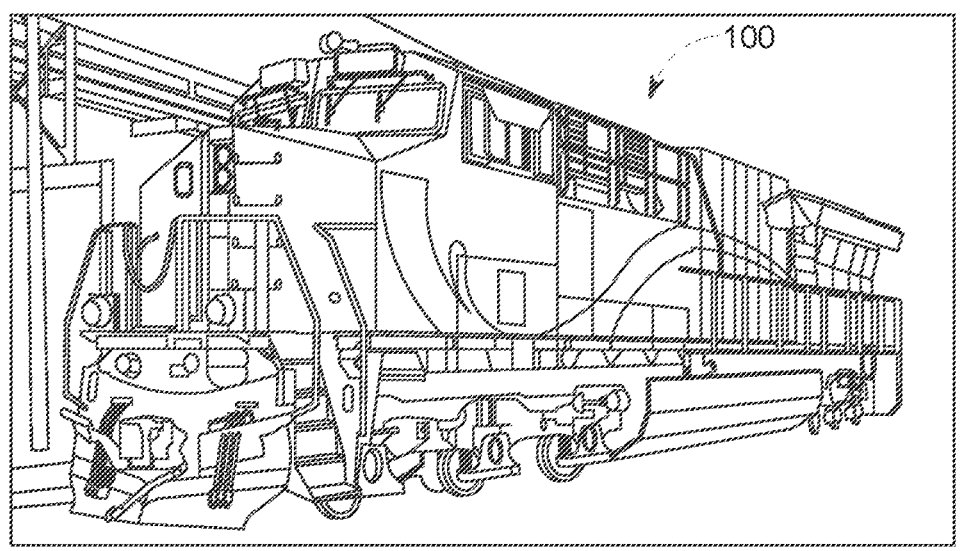
FIG. 1 illustrates one example of a powered system having a control system that uses one or more embodiments of subject matter described herein.
Figure 2:
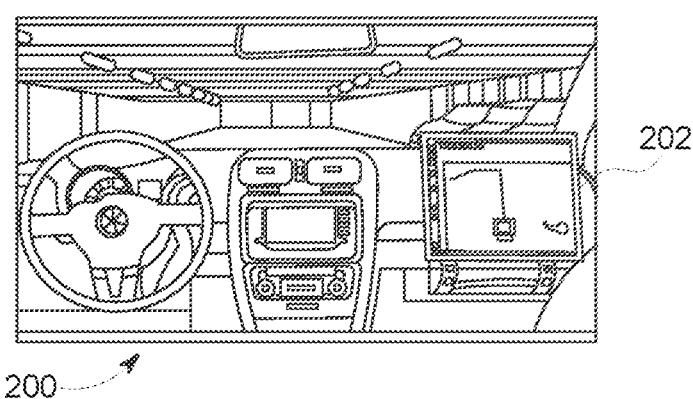
FIG. 2 illustrates another example of a powered system having a control system that uses one or more embodiments of subject matter described herein.
Figure 3:
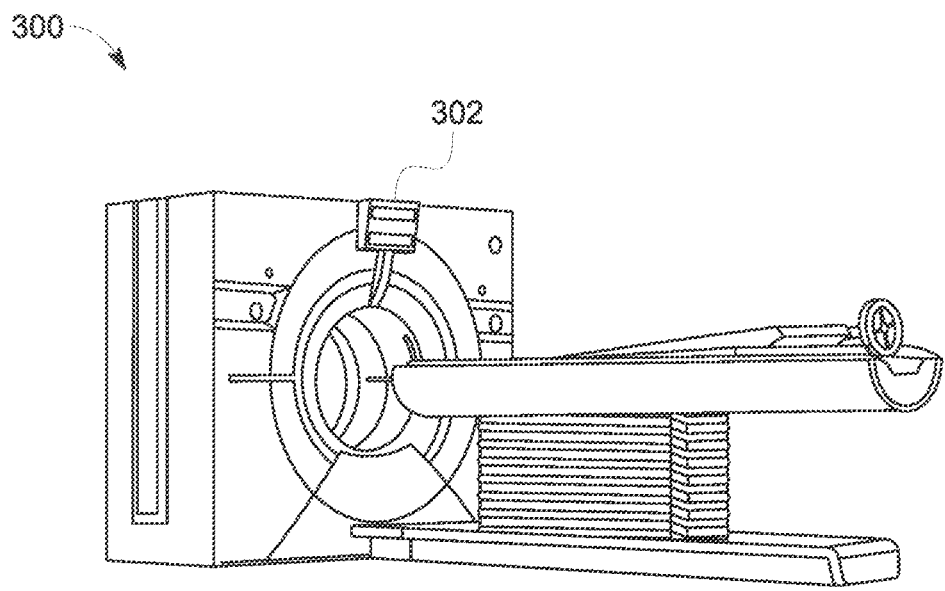
FIG. 3 illustrates another example of a powered system having a control system that uses one or more embodiments of subject matter described herein.
Figure 4:
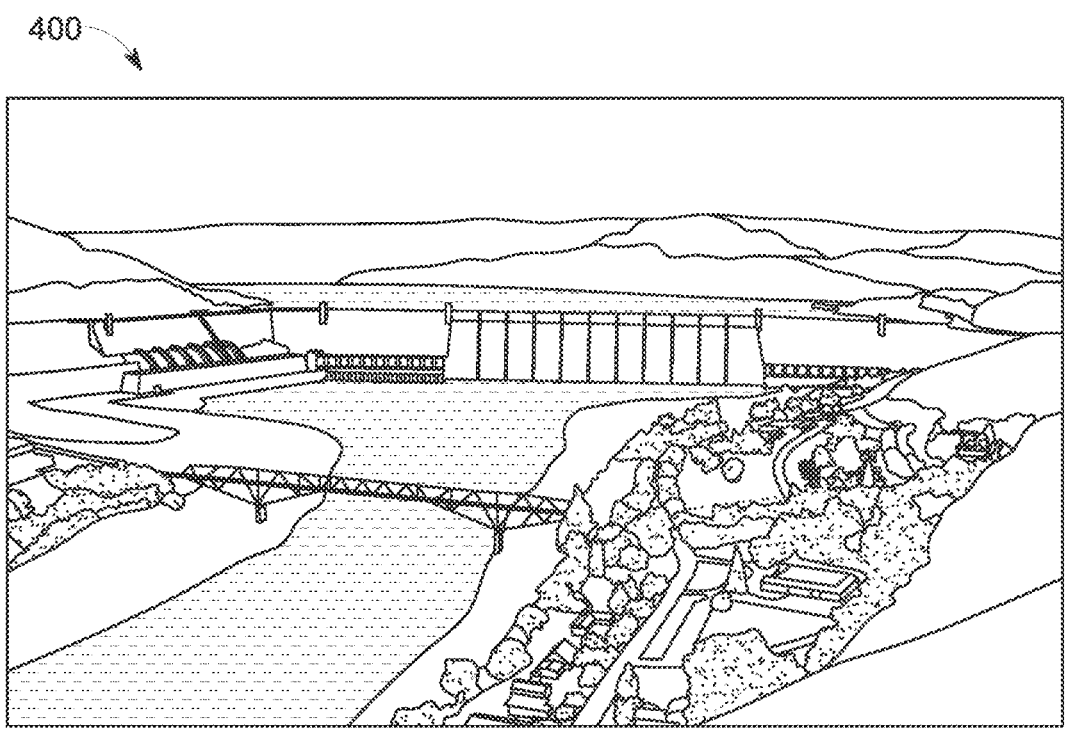
FIG. 4 illustrates another example of a powered system having a control system that uses one or more embodiments of subject matter described herein.

FIGS. 1 through 4 illustrate several examples of powered systems 100, 200, 300, 400 having control systems that use one or more embodiments of subject matter described herein. The powered system 100 shown in FIG. 1 is a locomotive, which has a control system that controls operations (e.g., movement and other actions) of the locomotive based on data obtained by, generated by, and/or communicated among devices of the locomotive and/or off-board the locomotive. The powered system 200 shown in FIG. 2 is an automobile, which has a control system 202 that controls operations (e.g., driver warnings, automated movement, or other actions) of the automobile based on data obtained by, generated by, and/or communicated among devices of the automobile and/or off-board the automobile. The powered system 300 shown in FIG. 3 is a medical device, such as a magnetic resonance imaging (MRI) device. Alternatively, the powered system 300 may represent several medical devices, such as medical equipment within a surgical suite, emergency room, hospital, or the like. The powered system 300 may include a control system 302 that controls operations of the medical equipment or devices, communicates information between or among the medical equipment or devices, etc., to allow for automated control of the equipment or devices, to provide information to operators of the equipment or devices, etc. The powered system 400 shown in FIG. 4 is a hydraulic power plant, which has a control system that controls operations of the plant based on data obtained by, generated by, and/or communicated among devices of the plant.

Figure 5:
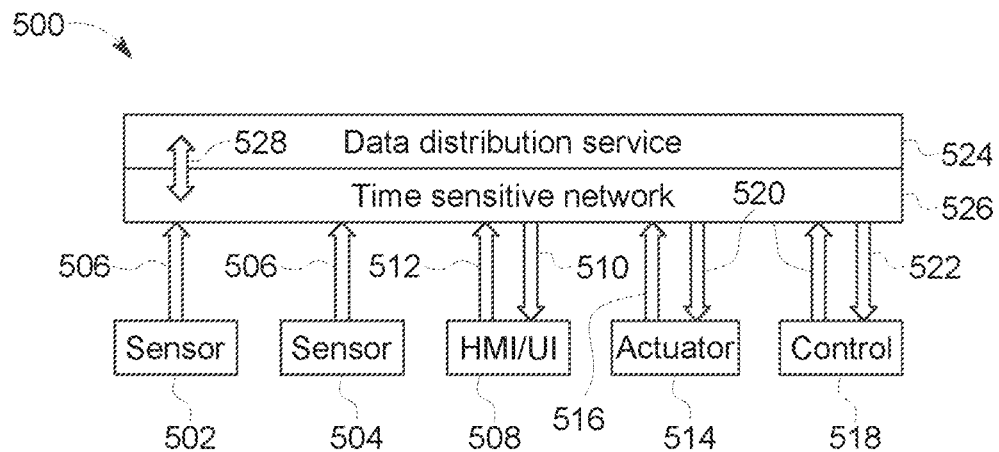
FIG. 5 illustrates one embodiment of a communication system.

FIG. 5 illustrates one embodiment of a communication system 500. The communication system 500 may be used by a control system 518 ("Control" in FIG. 5) to communicate data between or among devices of the control system 518 and/or the powered system that is controlled by the control system 518. The control system 518 may represent one or more of the control systems 100, 200, 300, 400 shown in FIGS. 1 through 4. The control system 518 shown in FIG. 5 represents hardware circuitry that includes and/or is connected with one or more processors (e.g., microprocessors, integrated circuits, field programmable gate arrays, etc.) that perform operations to control the powered system(s).

The communication system 500 communicates data between several devices, such as sensors 502, 504 that monitor, measure, record, etc. information and communicate this information as sensor data 506. Another device that can communicate via the communication system 500 can include a human machine interface (HMI) or user interface (UI) (shown as "HMI/UI" in FIG. 5) 508 that receives output or status data 510 that is to be presented to a user or operator of the communication system 500 or control system 518 and that can communicate input data 512 received from the user or operator to one or more other devices of the control system. The HMI/UI 508 can represent a display device, touchscreen, laptop, tablet computer, mobile phone, speaker, haptic device, or other device that communicates or conveys information to a user or operator.

In one embodiment, at least one of the sensors 502, 504 may be a camera that generates video or image data, an x-ray detector, an acoustic pick-up device, a tachometer, a global positioning system receiver, a wireless device that transmits a wireless signal and detects reflections of the wireless signal in order to generate image data representative of bodies or objects behind walls, sides of cars, or other opaque bodies, or another device.

Another device that can communicate using the communication system 500 includes one or more actuators 514, which represent devices, equipment, or machinery that move to perform one or more operations of the powered system that is controlled by the control system 518. Examples of actuators 514 include brakes, throttles, robotic devices, medical imaging devices, lights, turbines, etc. The actuators 514 can communicate status data 516 of the actuators 514 to one or more other devices in the powered system via the communication system 500. The status data 516 represent a position, state, health, or the like, of the actuator 514 sending the status data 516. The actuators 514 can receive command data 520 from one or more other devices of the powered system or control system via the communication system 500. The command data 520 represents instructions that direct the actuators 514 how and/or when to move, operate, etc.

The control system 518 can communicate (e.g., receive, transmit, and/or broadcast) a variety of data between or among the devices via the communication system 500. For example, the control system 518 can communicate the command data 520 to one or more of the devices and/or receive data 522, such as status data 516 and/or sensor data 506, from one or more of the devices. While devices are shown in FIG. 5 as sending certain data or receiving certain data, optionally, the devices may send and/or receive other types of data. For example, the sensors 502, 504 may receive data and/or send other types of data.

The communication system 500 communicates data between or among the devices and/or control system 518 using a communication network 526 that communicates data using a data distribution service 524. The network 526 is shown in FIG. 5 as a time sensitive network, but alternatively may be another type of network. The data distribution service 524 represents an object management group (OMG) device-to-device middleware communication standard between the devices and the network. The data distribution service 524 allows for communication between publishers and subscribers. The term publisher refers to devices 502, 504, 508, 514, 518 that send data to other devices 502, 504, 508, 514, 518 and the term subscriber refers to devices 502, 504, 508, 514, 518 that receive data from other devices 502, 504, 508, 514, 518. The data distribution service 524 is network agnostic in that the data distribution service 524 can operate on a variety of networks, such as Ethernet networks as one example. The data distribution service 524 operates between the network through which data is communicated and the applications communicating the data (e.g., the devices 502, 504, 508, 514, 518). The devices 502, 504, 508, 514, 518 can publish and subscribe to data over a distributed area to permit a wide variety of information to be shared among the devices 502, 504, 508, 514, 518.

In one embodiment, the data distribution service 524 is used by the devices 502, 504, 508, 514, 518 to communicate data 506, 510, 512, 516, 520, 522 through the network 526, which may operate on an Ethernet network of the powered system. The network 526 may be at least partially defined by a set of standards developed by the Time-Sensitive Networking Task Group, and includes one or more of the IEEE 802.1 standards. While an Ethernet network may operate without TSN, such a network may communicate data frames or packets in a random or pseudo-random manner that does not ensure that the data is communicated within designated time periods or at designated times. As a result, some data may not reach devices connected via the non-TSN Ethernet network in sufficient time for the devices to operate using the data. With respect to some control systems, the late arrival of data can have disastrous consequences, as described above. A TSN-based Ethernet network, however, can dictate when certain data communications occur to ensure that certain data frames or packets are communicated within designated time periods or at designated times. Data transmissions within a TSN-based Ethernet network can be based on a global time or time scale of the network that is the same for the devices in or connected with the network, with the times or time slots in which the devices communicate being scheduled for at least some of the devices.

The communication system 500 may use the network 526 to communicate data between or among the devices 502, 504, 508, 514, 518 using the data distribution service 524 in order to maintain QoS parameters 528 of certain devices 502, 504, 508, 514, 518. The QoS parameters 528 of the devices 502, 504, 508, 514, 518 represent requirements for data communication between or among the devices 502, 504, 508, 514, 518, such as upper limits on the amount of time or delay for communicating data between or among the devices 502, 504, 508, 514, 518. The QoS parameters 528 are determined for the data distribution service 524 and mapped (e.g., applied, or used to dictate how and/or when data is communicated, as described herein) to the network 526 in one embodiment.

A QoS parameter 528 can dictate a lower limit or minimum on data throughput in communication between or among two or more devices 502, 504, 508, 514, 518. A QoS parameter 528 can be used to ensure that data communicated with one or more devices 502, 504, 508, 514, 518, to one or more devices 502, 504, 508, 514, 518, and/or between two or more devices 502, 504, 508, 514, 518 is received in a timely manner (e.g., at designated times or within designated time periods).

The devices 502, 504, 508, 514, 518 can communicate the data (e.g., publish and/or subscribe to the data) according to the schedules dictated by the control system 518 in order to achieve or maintain the QoS parameters 528 of the devices 502, 504, 508, 514, 518. Other data and/or other devices may communicate with or among each other using the same network, but without a designated schedule and/or without being subject to QoS parameters 528. For example, the sensor 502, actuator 514, and control system 518 may have QoS parameters 528 and the control system 518 can dictate schedules for when the sensor 502, actuator 514, and control system 518 publish and/or receive data via the network 526.

The network 526 can be an Ethernet based network that communicates different categories or groups or types of data according to different priorities. For example, the network 526 can communicate time sensitive data according to the schedule or schedules determined by the control system 518 in order to achieve or maintain the QoS parameters 528 of certain devices 502, 504, 508, 514, 518. The network 526 can communicate other data between or among the same or other devices 502, 504, 508, 514, 518 as "best effort" traffic or rate constrained traffic. Best effort traffic includes the communication of data between or among at least some of the devices 502, 504, 508, 514, 518 that is not subject to or required to meet the QoS parameters 528 of the devices 502, 504, 508, 514, 518. This data may be communicated at a higher priority than the data communicated in rate constrained traffic, but at a lower priority than the data communicated according to the schedules dictated by the control system 518 in order to meet or achieve the QoS parameters 528 (also referred to herein as time sensitive traffic). The rate constrained traffic can include data that is communicated between or among the devices 502, 504, 508, 514, 518, but that is communicated at a lower priority than the time sensitive data and the best effort traffic. The time sensitive data, the best effort traffic, and the rate constrained traffic are communicated within or through the same network 526, but with different priorities. The time sensitive data is communicated at designated times or within designated time periods, while the best effort traffic and rate constrained traffic is attempted to be communicated in a timely manner, but that may be delayed in order to ensure that the time sensitive data is communicated to achieve or maintain the QoS parameters 528.

Figure 6:
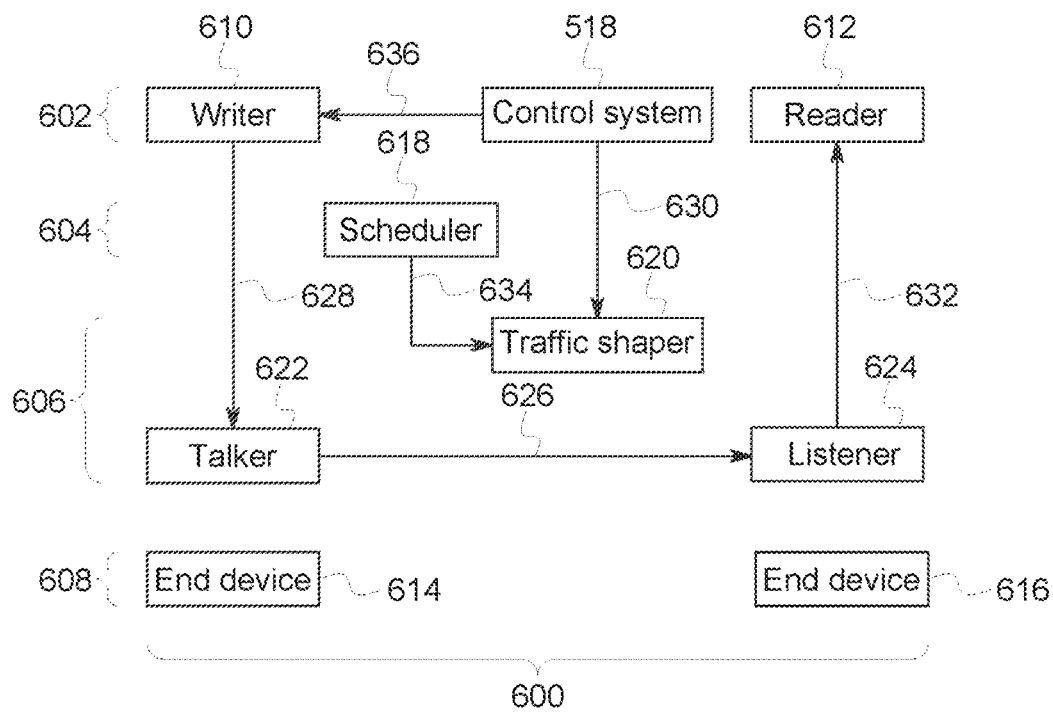
FIG. 6 illustrates another embodiment of a communication system.

FIG. 6 illustrates another embodiment of a communication system 600. The communication system 600 can represent one embodiment of the communication system 500 shown in FIG. 5. The components of the communication system 600 represent different or separate hardware circuitry that include and/or are connected with one or more processors (e.g., microprocessors, integrated circuits, field programmable gate arrays, etc.) that perform the operations described herein in connection with the various components.

The communication system 600 may be composed of several operational or functional layers 602, 604, 606, 608. The layers 602, 604 represent the data distribution service 524 and the layers 606, 608 represent the time sensitive network 526 shown in FIG. 5. The layer 602 is an application layer that dictates the protocols and methods of communication used by hosts in the communication system 600. A writer or writing device 610 and a reader or reading device 612 are within the application layer 602 of the data distribution service 524 shown in FIG. 5. The writer 610 is a communication device that publishes information or data for communication to or among end devices 614, 616 of the control system 518. The end devices 614, 616 can represent one or more actuators, user interfaces, sensors, or other devices, such as one or more of the sensors 502, 504, HMI/UI 508, and/or actuator 514 shown in FIG. 5. The reader 612 receives or obtains this information or data provided by the writer 610 and provides the information or data to the end devices 614, 616. While only a single writer 610, a single reader 612, and two end devices 614, 616 are shown in FIG. 6, the communication system 600 may include many more writers 610, readers 612, and/or end devices 614, 616.

The layer 604 is a transport layer within the time sensitive network 526 shown in FIG. 5 that provides communication services between devices in the communication system 600, such as data stream support, control over the flow of data in the communication system 600, etc. The transport layer 604 includes a scheduling device or scheduler 618 that determines when various communications between devices within the system 600 occur, as described in more detail below.

The layer 606 is a network layer that routes data and information through networked devices, such as routers, switches (e.g., Ethernet switches), or other devices that communicate data packets between different devices in the communication system 600. A traffic shaping device or traffic shaper 620 controls the traffic profile of data being communicated within the communication system 600. This can include controlling the amount or volume of data being communicated within the time sensitive network 526 within a designated time period, such as by delaying the communication of some data packets while communicating other data packets at various times.

Also disposed in the network layer 606 are a talker device 622 and a listening device or listener 624. The talker 622 and listener 624 are the devices within the time sensitive network 526 that establish a communication link (also referred to as a virtual link) through which data or information is communicated between the writer 610 and the reader 612.

For example, the talker 622 can send an advertise signal 626 to the listener 624 that requests that a communication link be established between the talker 622 and the listener 624. If there are sufficient resources for communicating data from the talker 622 to the listener 624 (e.g., sufficient bandwidth, available routers and/or switches, etc.), then the communication link between the talker 622 and the listener 624 is created. Otherwise, the communication link is not established.

Data or information that is published by the writer 610 is provided to the talker 622, which communicates the data or information through the time sensitive network 526 to the listener 624. The listener 624 then communicates this data or information to the reader 612. The end devices 614, 616 may be communicatively coupled with the writer 610 and reader 612. For example, the device 614 may provide data (e.g., sensor data) to the writer 610, which publishes or otherwise communicates the data to the talker 622 as published data 628. The talker 622 communicates this published data 628 to the listener 624. The talker 622 communicates the data through one or more networked devices in the time sensitive network 526, such as routers and/or Ethernet switches. The listener 624 receives the data and communicates the data to the reader 612 as received data 632. The reader 612 can then communicate the received data to the device 616, such as the HMI/UI 508, the control system 518, and/or the actuator 514.

In one embodiment of the inventive subject matter described herein, components within the data distribution service 524 and/or otherwise outside of the time sensitive network 526 communicate with components in the time sensitive network 526 to direct changes in how data is communicated within the time sensitive network 526, while ensuring that the time sensitive data communications arrive in time or within designated times and/or that rate constrained traffic and best effort traffic does not interfere with or prevent the timely delivery of the time sensitive data.

The control system 518 communicates a communication change 630 to the traffic shaper 620 in the time sensitive network 526. This change 630 can include a new or different QoS parameter 528. As described above, the QoS parameter 528 can dictate a lower limit or minimum on data throughput in communication between or among two or more devices 614, 616. The control system 518 may change the QoS parameter 528 for communications to and/or from one or more devices 614, 616 based on changing circumstances. For example, the control system 518 may require that data from a sensor 502 is obtained and/or communicated to an HMI/UI 508 more often after a fault condition with one or more components of a powered system is identified. The QoS parameter 528 can be used to ensure that data communicated with one or more devices 614, 616, to one or more devices 614, 616, and/or between two or more devices 614, 616 are received in a timely manner (e.g., at designated times or within designated time periods). As another example, the control system 518 may change a type of communication, such as by changing a rate constrained or best effort communication to a time sensitive communication, or another such change.

Optionally, responsive to user input received by the control system 518 via the HMI/UI 508 directing a change in operational modes or states of the powered system being controlled by the control system 518, the control system 518 may change the QoS parameter 528 for communication with or between different devices 614, 616. Alternatively, the control system 518 may direct other changes 630 to communications. For example, a new device 614, 616, new talker 622, and/or new listener 624 may be added to the time sensitive network 526. As another example, the control system 518 may direct that new or different information is communicated to and/or from one or more devices 614, 616, and/or may change when information is communicated with and/or between the devices 614, 616.

Responsive to receiving the change 630 from the control system 518, the traffic shaper 620 and the scheduler 618 communicate with each other to determine how to shape and schedule the communications within or through the time sensitive network 526, including those communications involving or impacted by the change 630. The scheduler 618 may be responsible to dictating when time sensitive communications occur in order to ensure that there is sufficient bandwidth to successfully communicate the data in the time sensitive communications at or within the time limits associated with the time sensitive communications. The total bandwidth available for communicating data within the time sensitive network 526 may be known based on the currently available network devices such as routers and switches in the time sensitive network 526. Based on the available bandwidth, the amount of bandwidth consumed by the time sensitive communications (which may be reported to the scheduler 618 from the control system 518, the writers 610, and/or other devices), and the times or time limits in which the time sensitive communications occur, the scheduler 618 may determine what bandwidth is available, and when the bandwidth is available.

For example, during a first time period, 20% of the total bandwidth of the time sensitive network 526 may be available for rate constrained data traffic and/or best effort traffic because the other 80% is used by time sensitive communications. During a different, second time period, 95% of the total bandwidth of the time sensitive network 526 may be available for rate constrained data traffic and/or best effort traffic because the other 5% is used by time sensitive communications. Other time periods may have other, different amounts of bandwidth available for communicating non-time sensitive traffic.

The scheduler 618 and the traffic shaper 620 communicate with each other to determine what communication schedules are feasible to achieve the changes 630 in communications requested or directed by the control system 518. As one example, the scheduler 618 and the traffic shaper 620 communicate with each other to determine what communication schedules are feasible to achieve the QoS parameter(s) 528 received from the control system 518. The scheduler 618 can determine feasible schedules for the non-time sensitive communications to occur within the time sensitive network 526. Based on the amount of available bandwidth and the times at which the different amounts of bandwidth are available, the scheduler 618 can notify the traffic shaper 620 how much data can be communicated within the time sensitive network 526 and when the data can be communicated. The scheduler 618 may reserve sufficient bandwidth at designated times so that there is sufficient bandwidth to ensure that the time sensitive communications successfully occur or reach the intended recipients (e.g., the readers 612) no later than the designated times or within the designated time limits of the time sensitive communications. At least some of the remaining bandwidth may be usable by the non-time sensitive communications. The scheduler 618 may communicate a needed network availability 634 to the traffic shaper 620. The network availability 634 indicates how much bandwidth is available for non-time sensitive communications at different times.

Based on receipt of the network availability 634, the traffic shaper 620 can determine when different data packets or frames of the non-time sensitive communications can occur. This can involve the traffic shaper 620 delaying communication of one or more groups of packets, frames, or datagrams to bring the communication of the groups into a traffic profile. The writers 610 and the readers 612 communicating non-time sensitive communications may then be restricted to communicating the data packets, frames, or datagrams at the times restricted by the traffic profile. This ensures that the time sensitive communications have sufficient bandwidth to be communicated in a timely manner within the time sensitive network 526, while also allowing for the rate constrained and/or best effort traffic to be communicated within the network 526, without interfering with the time sensitive communications. This communication can be ensured even in light of changes 630 created by the control system 518 while the writers 610 and readers 612 continue to communicate within the time sensitive network 526. For example, changes to the QoS parameters, time sensitive communications, etc., may occur without having to shut down or otherwise restart the devices or components in the time sensitive network 526.

Figure 7:
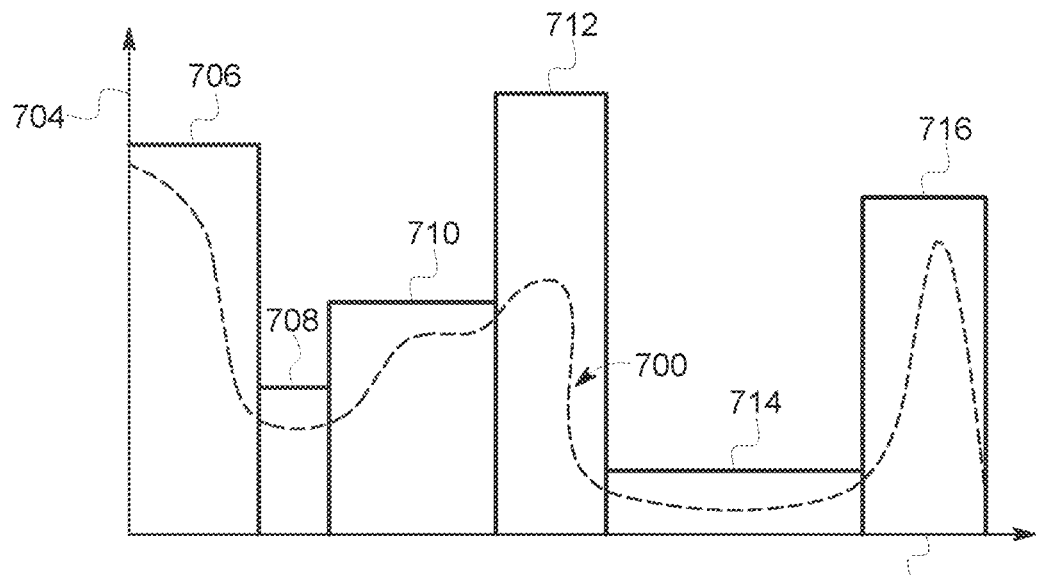
FIG. 7 schematically illustrates one example of a traffic profile determined by a traffic shaper shown in FIG. 6 for communication within a time sensitive network shown in FIG. 5.

FIG. 7 schematically illustrates one example of a traffic profile 700 that is determined by the traffic shaper 620 shown in FIG. 6 for the communication of non-time sensitive communications within the time sensitive network 526 shown in FIG. 5. The traffic profile 700 is shown alongside a horizontal axis 702 representative of time and a vertical axis 704 representative of amounts of bandwidth available for communication in the time sensitive network 526. Several bandwidth limits 706, 708, 710, 712, 714, 176 are shown as rectangles in FIG. 7. These limits 706, 708, 710, 712, 714, 176 represent the upper restrictions on the amount of bandwidth, or the net bit rate, channel capacity, or throughput, of data communications in the time sensitive network 526. The vertical height of the bandwidth limits 706, 708, 710, 712, 714, 176 indicate the upper limits on the rates at which data can be communicated, while the horizontal widths of the bandwidth limits 706, 708, 710, 712, 714, 176 indicate the time period over which the respective bandwidth limits 706, 708, 710, 712, 714, 176 are applicable.

The bandwidth limits 706, 708, 710, 712, 714, 176 for a specific route or path through the network change over time. These limits for each, or at least one or more, route or path change in order to ensure that there is sufficient bandwidth for communicating the time sensitive communications. The limits 708, 714 may be lower (e.g., represent reduced bandwidths available for communication of non-time sensitive communications) than the limits 706, 710, 712, 716 because more bandwidth is needed during time periods over which the limits 708, 714 extend for the communication of time sensitive communications than during the time periods over which the limits 706, 710, 712, 716 extend. The traffic profile 700 can represent the amount of bandwidth used by the communication of non-time sensitive communications. For example, the traffic shaper 620 can restrict (or only permit) the communication of rate constrained traffic and best effort traffic within the bandwidths represented by the traffic profile 700 at the associated times. The traffic profile 700 is provided merely as one example.

As the control system 518 (shown in FIG. 5) issues changes 630 (shown in FIG. 6) to the traffic shaper 620, the traffic shaper 620 may refer to the network availabilities 634 provided by the scheduler 618 to determine new or different traffic profiles 700 that may be used to continue communicating the non-time sensitive communications without interfering with or restricting the communication of the time sensitive communications. The traffic profile 700 may be adjusted without shutting down or restarting the time sensitive network 526, thereby providing a dynamically adjustable time sensitive network 526. Restarting a network can involve stopping all communications through or within the network for a non-instantaneous time while the devices in the network adjust to new or different settings.

Figure 8:
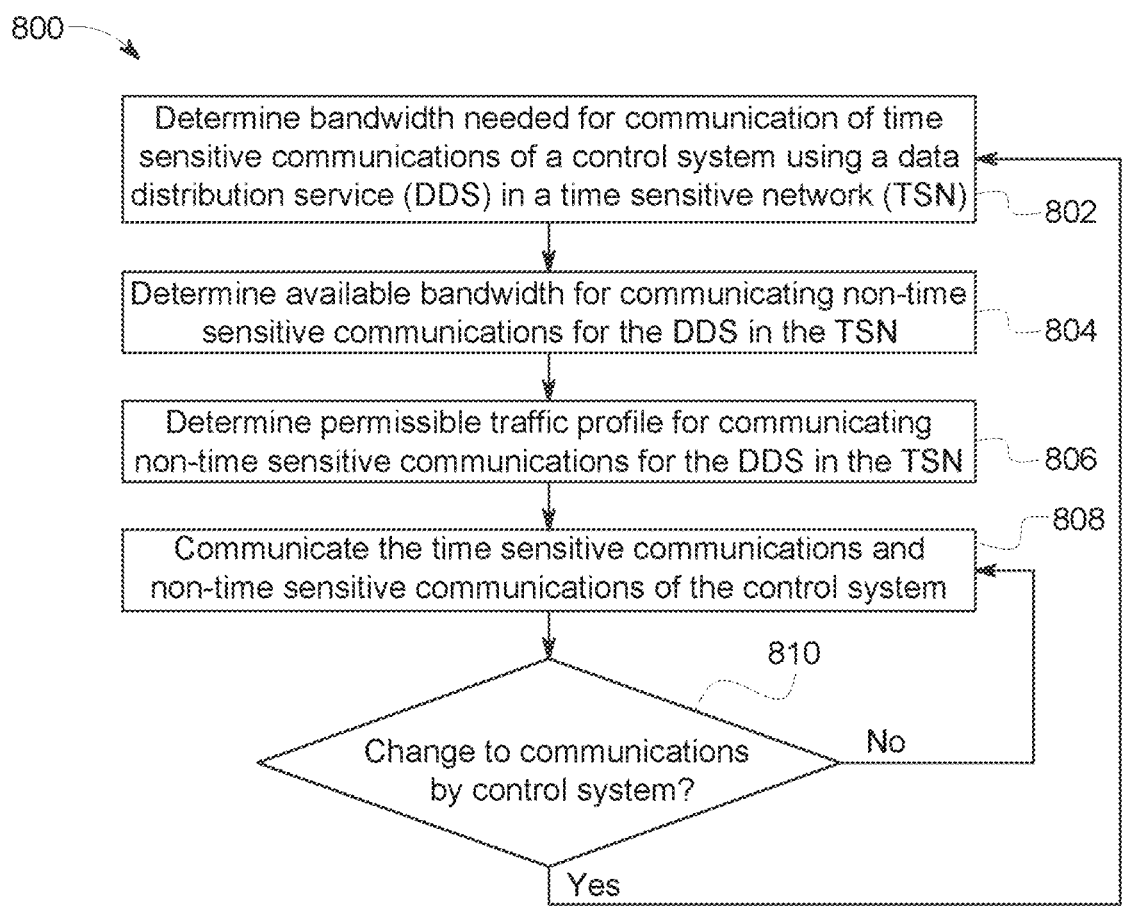
FIG. 8 illustrates a flowchart of one embodiment of a method for dynamically integrating a data distribution service into a time sensitive network.

FIG. 8 illustrates a flowchart of one embodiment of a method 800 for dynamically integrating a data distribution service into a time sensitive network. The method 800 may be performed by one or more embodiments of the communication systems described herein. In one embodiment, the method 800 represents software operating on and/or directing operations of the communication systems described herein. For example, the control systems, schedulers, traffic shapers, writers, readers, talkers, listeners, and/or devices described herein may perform the operations of the method 800. Optionally, the method 800 may be used to create such software.

At 802, a bandwidth needed for communication of time sensitive communications of a control system using a data distribution system in a time sensitive network may be determined. The control system may inform the scheduler of the data distribution system of the time sensitive communications that are needed or requested, and the scheduler can determine how much bandwidth is needed for the time sensitive communications at different times to ensure that the communications successfully occur between the writers and the readers. For example, the control system may inform the scheduler of the data sizes of the time sensitive communications and the times or time periods in which these communications are to occur.

At 804, an available bandwidth for communication of non-time sensitive communications of the data distribution service in the time sensitive network is determined. The traffic shaper can examine the bandwidth that is not reserved or scheduled to be used by the time sensitive communications by the scheduler. This remaining amount of bandwidth may be used for the communication of rate constrained communications and/or best effort communications between the writers and the readers of the data distribution service.

At 806, a permissible traffic profile for the communication of the non-time sensitive communications is determined. The traffic shaper can determine this profile as representative of how much non-time sensitive data can be communicated at different times, based on the available bandwidth for non-time sensitive communications that are available at different times. At 808, the time sensitive communications and non-time sensitive communications of the data distribution service are communicated in the time sensitive network. The time sensitive communications may be communicated along or via communication or virtual links between some writers and readers using sufficient bandwidth to ensure that the time sensitive communications occur no later than designated times or within designated time periods. The non-time sensitive communications may be communicated along or via communication or virtual links between the same and/or different writers and readers, but according to the traffic profile determined by the traffic shaper.

At 810, a determination is made as to whether any changes to the communication of data of the data distribution service in the time sensitive network is requested or directed (e.g., by the control system). The change may be a new or different QoS parameter of communications, a new or different reader or writer in the data distribution service, a change in a communication between a writer and one or more readers from a time sensitive communication to a non-time sensitive communication, a change in a communication between a writer and one or more readers from a non-time sensitive communication to a time sensitive communication, a change in what information is communicated between writers and readers, or another change. As described above, the change(s) may be requested or directed by the control system.

If a change in communication is requested or directed by the control system, then flow of the method 800 can return toward 802. For example, the method 800 can again determine what bandwidth is needed for the communication of time sensitive communications, what bandwidth is available for the communication of non-time sensitive communications, and the traffic profile for use in communicating the non-time sensitive communications subject to the communication changes. If a change is not requested or directed, then flow of the method 800 can return to 808 so that the time sensitive communications and non-time sensitive communications occur without changes to the time sensitive network.

Figure 9:
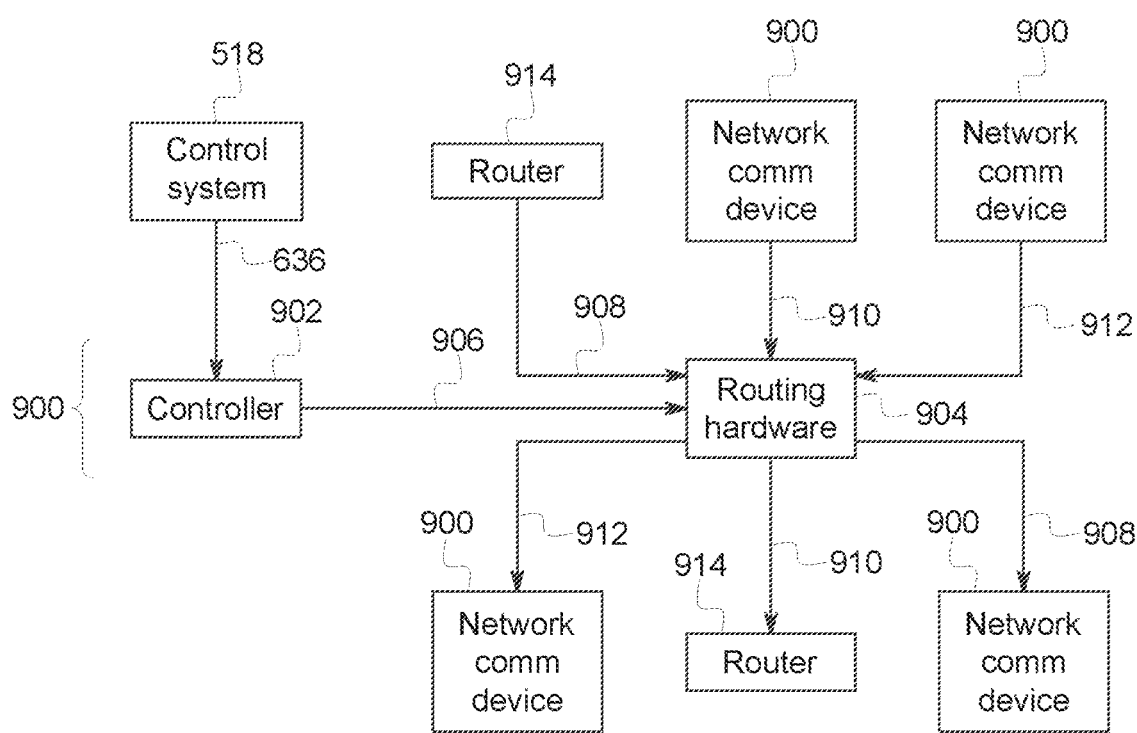
FIG. 9 illustrates a distributed network communication device according to one embodiment.

FIG. 9 illustrates a distributed network communication device 900 according to one embodiment. The device 900 can represent one or more of the devices that communicate data within the time sensitive network 526. For example, the device 900 can operate similar to a router by receiving data packets addressed to different locations and then forwarding the packets to other devices 900 or the addressed locations so that the data packets arrive at the addressed locations.

In contrast to known routers, however, the device 900 includes a controller 902 and routing hardware 904 that are separate from each other. The controller 902 and hardware 904 may be in separate, remote locations. For example, the hardware 904 may be disposed in one housing in a server room or rack, while the controller 902 is disposed in a separate, different housing in another room, building, city, county, or state. The controller 902 represents hardware circuitry that includes and/or is connected with one or more processors (e.g., microprocessors, integrated circuits, or field programmable gate arrays) that control how the routing hardware 904 communicates data in the time sensitive network 526 (or another network). The hardware circuitry of the controller 902 can include transceiving circuitry or transmitting circuitry, such as one or more modems, antennas, or the like, to permit the controller 902 to communicate with the routing hardware 904 from far away.

The controller 902 may include the control plane of the device 900, which determines where different data packets are to be forwarded toward. For example, the controller 902 include or access a memory device (e.g., a computer hard drive, random access memory, flash drive, etc.) that stores one or more routing tables. These tables can indicate where incoming data packets are to be forwarded. For example, the tables can indicate the paths or routes in the time sensitive network 526 that different data packets should be forwarded between the routing hardware 904 of the devices 900 in order to move the data packets from the writers 610 to the appropriate readers 612.

As described above, the control system 518 can control and/or change 630 communications within the time sensitive network 526. The controllers 902 of the devices 900 in the network 526 can respond to the changes 630 by changing the routing tables or other information used by the controllers 902 to determine where the different devices 900 are to route the different data packets toward in order to ensure that the time sensitive communications and non-time sensitive communications are completed, as described herein. As shown in FIG. 6, the control system 518 may communicate routing information 636 to the writers 610 that indicates where the published data 628 of the writers 610 are to be routed toward. This routing information 636 may be used by the controllers 902 of the devices 900 to determine how to route the data packets accordingly.

The routing hardware 904 represents a forwarding plane of the device 900. The hardware 904 includes circuitry that has network interfaces to allow for the communication of data packets through the routing hardware 904. The hardware 904 also includes transceiving and/or receiving circuitry, such as one or more modems, antennas, or the like, to permit the hardware 904 to communicate with the controller 902.

In operation, the control system 518 communicates the routing information 636 to the controllers 902 of the devices 900 to inform the controllers 902 where various data packets are to be communicated toward or to within the time sensitive network 526 for the time sensitive and non-time sensitive communications described herein. Responsive to receiving the routing information 636, the controllers 902 send instructions 906 to the routing hardware 904 of the corresponding devices 900 to instruct the routing hardware 904 how to forward the data packets to achieve the routing information 636 received from the control system 518. The routing hardware 904 receives a variety of different data packets 908, 910, 912 from other devices 900, routers 914, and the like.

The routing hardware 904 forwards these packets 908, 910, 912 to other devices 900, routers 914, and the like, according to the instructions 906 in order to cause the data packets 908, 910, 912 to travel along the paths dictated by the routing information 636. The packets 908, 910, 912 eventually reach the addressed destinations (e.g., readers 612) in order to complete the time sensitive and/or non-time sensitive communications described herein. The control system 518 may dynamically change the routing information 636 in order to vary where different data packets are forwarded by the hardware 904 without shutting down or restarting the devices 900.

In one embodiment, a network calculus engine may work with the scheduler 618 (or the scheduler 618 may use network calculus) to determine how to set network traffic latency requirements for each, or at least one or more, path or route through the network. If the scheduler 618 cannot determine a feasible schedule, network calculus can be used to provide feedback to an operator of the network about why a schedule could not be found. For example, the network calculus engine could suggest to the operator which virtual links would benefit most or more than others from easing traffic load or increasing maximum (or another upper limit on) latency. The network calculus engine can provide a filter before scheduling is run to suggest whether a result would even be feasible. This could be beneficial for large complex networks for which scheduling without the filter would be a significant time-consuming process. The network calculus engine can provide results about queuing throughout the network in case buffer storage becomes an issue.

In one embodiment, a method includes determining bandwidth for communication of time sensitive communications between devices of a control system using a DDS in a TSN, determining available bandwidth for communication of non-time sensitive communications of the control system using the DDS in the TSN, communicating the non-time sensitive communications in the TSN without preventing communication of the time sensitive communications in the TSN based on the available bandwidth, receiving a communication change from the control system at the TSN, and changing one or more of the bandwidth for the communication of the time sensitive communications or the available bandwidth for the communication of the non-time sensitive communications in the TSN without restarting the TSN.

In one example, the time sensitive communications include communications required to be completed before designated times or within designated time periods by the control system.

In one example, the communication change from the control system directs a change in a quality of service (QoS) of communications in the TSN.

In one example, the communication change from the control system directs a change in one or more of the non-time sensitive communications to one of the time sensitive communications.

In one example, the communication change from the control system directs a change in one or more of the time sensitive communications to one of the non-time sensitive communications.

In one example, the communication change from the control system directs an addition of a network device to the TSN.

In one example, the communication change from the control system directs removal of a network device from the TSN.

In one example, the communication change from the control system instructs a distributed communication device having a controller and routing hardware that are separate and remotely located from each other to change where one or more data packets are forwarded in the TSN.

In one example, the method also includes communicating routing information from the control system to the controller of the distributed communication device that directs a change in where the one or more data packets are forwarded in the TSN responsive to receiving the communication change from the control system. The method also can include sending one or more instructions from the controller to the routing hardware to instruct the routing hardware where to forward the one or more data packets according to the routing information.

In one embodiment, a system includes a scheduling device of a DDS configured to determine bandwidth for communication of time sensitive communications between devices of a control system using the DDS in a TSN. The scheduling device also is configured to determine available bandwidth for communication of non-time sensitive communications of the control system using the DDS in the TSN, and is configured to control communication of the non-time sensitive communications in the TSN without preventing communication of the time sensitive communications in the TSN based on the available bandwidth. The system also can include a traffic shaper of the TSN configured to receive a communication change from the control system at the TSN. The scheduling device is configured to change one or more of the bandwidth for the communication of the time sensitive communications or the available bandwidth for the communication of the non-time sensitive communications in the TSN without restarting the TSN.

In one example, the time sensitive communications include communications required to be completed before designated times or within designated time periods by the control system.

In one example, the communication change from the control system directs a change in a quality of service (QoS) of communications in the TSN.

In one example, the communication change from the control system directs a change in one or more of the non-time sensitive communications to one of the time sensitive communications.

In one example, the communication change from the control system directs a change in one or more of the time sensitive communications to one of the non-time sensitive communications.

In one example, the communication change from the control system directs an addition of a network device to the TSN.

In one example, the communication change from the control system directs removal of a network device from the TSN.

In one example, the system also includes one or more distributed communication devices each having a controller and routing hardware that are separate and remotely located from each other. The controllers can be configured to instruct the routing hardware of the respective distributed communication devices where to forward data packets within the TSN.

In one example, the communication change from the control system directs a change in where one or more of the data packets are forwarded by the routing hardware in the TSN.

In one embodiment, a distributed communication device includes a controller configured to one or more of store or access routing instructions that direct where data packets are to be forwarded within a TSN for one or more writing devices and one or more reader devices of a DDS. The device also can include routing hardware configured to be remotely located from the controller and to receive instructions from the controller to change where the data packets are forwarded within the TSN.

In one example, the routing hardware is configured to receive the instructions from the controller to change where the data packets are forwarded within the TSN and to change how the data packets are forwarded with in the TSN without restarting either the controller or the routing hardware.

It is to be understood that the above description is intended to be illustrative, and not restrictive. For example, the above-described embodiments (and/or examples thereof) may be used in combination with each other. In addition, many modifications may be made to adapt a particular situation or material to the teachings of the inventive subject matter without departing from its scope. While the dimensions and types of materials described herein are intended to define the parameters of the inventive subject matter, they are by no means limiting and are exemplary embodiments. Many other embodiments will be apparent to one of ordinary skill in the art upon reviewing the above description. The scope of the inventive subject matter should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose several embodiments of the inventive subject matter and also to enable a person of ordinary skill in the art to practice the embodiments of the inventive subject matter, including making and using any devices or systems and performing any incorporated methods. The patentable scope of the inventive subject matter is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The foregoing description of certain embodiments of the inventive subject matter will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, processors or memories) may be implemented in a single piece of hardware (for example, a general purpose signal processor, microcontroller, random access memory, hard disk, and the like). Similarly, the programs may be stand-alone programs, may be incorporated as subroutines in an operating system, may be functions in an installed software package, and the like. The various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" of the inventive subject matter are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

What is claimed is:

1. A method in a communication network, comprising:
   determining a transmission schedule for a plurality of data sources providing a data distribution service (DDS), the transmission schedule configured to meet communication requirements of both time-sensitive traffic and non-time-sensitive traffic of the plurality of data sources such that the DDS is provided in at least one of time-sensitive communication and non-time sensitive communication based on DDS configuration;
   transmitting data according to the transmission schedule by shaping the time-sensitive traffic and the non-time-sensitive traffic at the plurality of data sources according to the transmission schedule;
   receiving a communication change command;
   determining a new transmission schedule for the plurality of data sources, the new transmission schedule configured to meet the communication requirements of both the time-sensitive traffic and the non-time-sensitive traffic in accordance with the communication change command without restarting any devices of the communication network; and
   transmitting data according to the new transmission schedule.

2. The method of claim 1, wherein the communication network is IEEE 802.1 time-sensitive network coupling the plurality of data sources to listeners.

3. The method of claim 1, wherein the communication network carries messages of a control system.

4. The method of claim 3, wherein the plurality of data sources and listeners in the control system communicate with a data distribution service.

5. The method of claim 1, wherein the communication change command comprises one or more of a change in: priority or QoS of one or more of the time-sensitive traffic or the non-time-sensitive traffic; one or more of a source or path or destination of one or more of the time-sensitive traffic or the non-time-sensitive traffic; one or more of addition or deletion of time-sensitive traffic or non-time-sensitive traffic; or one or more of addition or removal of one or more data sources or data listeners.

6. The method of claim 1, wherein the communication requirements comprise one or more of a bandwidth requirement or a latency requirement.

7. The method of claim 1, where in the transmission schedule includes a communication schedule for a time-sensitive network and a bandwidth profile for a non-time-sensitive network.

8. The method of claim 1, wherein the communication change command instructs a distributed communication device having a controller and routing hardware that are separate and remotely located from each other to change where one or more data packets are forwarded in the communication network.

9. The method of claim 8, further comprising:
   communicating routing information to the controller of the distributed communication device that directs a change in where the one or more data packets are forwarded in the communication network responsive to receiving the communication change command; and sending one or more instructions from the controller to the routing hardware to instruct the routing hardware where to forward the one or more data packets according to the routing information.

10. The method of claim 9, further comprising:
responsive to the communication change command, changing a routing table that is used to determine where different devices are to route data packets of the time-sensitive traffic and the non-time-sensitive traffic to ensure that the time-sensitive traffic and the non-time-sensitive traffic are completed.

11. A system, comprising:
a plurality of data sources;
a communication network configured to
communicate data between the plurality of data sources,
determine a transmission schedule for the plurality of data sources providing a data distribution service (DDS), the transmission schedule configured to meet communication requirements of both time-sensitive traffic and non-time-sensitive traffic of the plurality of data sources such that the DDS is provided in at least one of time-sensitive communication and non-time sensitive communication based on DDS configuration, and
transmit data according to the transmission schedule by shaping the time-sensitive traffic and the non-time-sensitive traffic at the plurality of data sources according to the transmission schedule; and
a control system configured to issue a communication change command, wherein the communication network, responsive to the communication change command determines a new transmission schedule, the new transmission schedule configured to meet the communication requirements of both the time-sensitive traffic and the non-time sensitive traffic without restarting any devices of the communication network, and transmits data according to the new transmission schedule.

12. The system of claim 11, wherein the communication network is IEEE 802.1 time-sensitive network coupling the plurality of data sources to listeners.

13. The system of claim 11, wherein the communication network carries messages of the control system.

14. The system of claim 12, wherein the data sources and listeners in the control system communicate with a data distribution service.

15. The system of claim 11, wherein the communication change command comprises one or more of a change in: priority or QoS of one or more of the time-sensitive traffic or the non-time-sensitive traffic; one or more of a source or path or destination of one or more of the time-sensitive traffic or the non-time-sensitive traffic; one or more of addition or deletion of time-sensitive traffic or non-time-sensitive traffic; or one or more of addition or removal of one or more data sources or data listeners.

16. The system of claim 11, wherein the communication requirements comprise one or more of a bandwidth requirement or a latency requirement.

17. The system of claim 11, where in the transmission schedule includes a communication schedule for a time-sensitive network and a bandwidth profile for a non-time-sensitive network.

18. The system of claim 11, wherein the communication change command instructs a distributed communication device having a controller and routing hardware that are separate and remotely located from each other to change where one or more data packets are forwarded in the communication network.

19. The system of claim 18, wherein the control system is further configured to:
communicate routing information to the controller of the distributed communication device that directs a change in where the one or more data packets are forwarded in the communication network responsive to receiving the communication change command; and
send one or more instructions from the controller to the routing hardware to instruct the routing hardware where to forward the one or more data packets according to the routing information.

20. The system of claim 19, wherein the controller, responsive to the communication change command, changes a routing table that is used to determine where different devices are to route data packets of the time-sensitive traffic and the non-time-sensitive traffic to ensure that the time-sensitive traffic and the non-time-sensitive traffic are completed.

* * * * *